(12) United States Patent
Bastian et al.

(10) Patent No.: US 8,936,222 B1
(45) Date of Patent: Jan. 20, 2015

(54) SYSTEM AND METHOD FOR MAGNETICALLY SUPPORTING A DEVICE UPON A STRUCTURE

(71) Applicants: James W. Bastian, Fargo, ND (US); Thomas W. Bastian, Tucson, AZ (US)

(72) Inventors: James W. Bastian, Fargo, ND (US); Thomas W. Bastian, Tucson, AZ (US)

(*) Notice: Subject to any disclaimer, the term of this patent is extended or adjusted under 35 U.S.C. 154(b) by 0 days.

(21) Appl. No.: 14/244,920

(22) Filed: Apr. 4, 2014

Related U.S. Application Data

(60) Provisional application No. 61/909,468, filed on Nov. 27, 2013.

(51) Int. Cl.
    *A47G 1/17* (2006.01)
    *H05K 5/02* (2006.01)
    *A45F 5/00* (2006.01)

(52) U.S. Cl.
    CPC ............... *H05K 5/0204* (2013.01); *A45F 5/00* (2013.01); *Y10S 224/901* (2013.01)
    USPC ............. 248/206.5; 248/205.1; 224/183; 224/901

(58) Field of Classification Search
    CPC ............... A45F 2200/0508; A45F 2200/0516; A41E 1/002; A44D 2203/00; A47G 1/17; F16B 2001/0035
    USPC ........ 248/206.5, 205.1; 224/183, 901; 24/303
    See application file for complete search history.

(56) References Cited

U.S. PATENT DOCUMENTS

| | | | | |
|---|---|---|---|---|
| 2,297,806 A * | 10/1942 | Smith | | 211/69.1 |
| 2,644,212 A * | 7/1953 | Markowitz | | 24/11 R |
| 3,239,178 A * | 3/1966 | Pompa | | 248/205.3 |
| 4,265,002 A * | 5/1981 | Hosken | | 24/303 |
| 4,982,581 A * | 1/1991 | Furuyama | | 63/29.1 |
| 5,450,658 A * | 9/1995 | Hicks | | 24/303 |
| 5,895,018 A * | 4/1999 | Rielo | | 248/206.5 |
| 5,933,926 A * | 8/1999 | Reiter | | 24/303 |
| 5,992,807 A * | 11/1999 | Tarulli | | 248/206.5 |
| 6,282,760 B1 * | 9/2001 | Mars | | 24/303 |
| 6,644,617 B2 * | 11/2003 | Pitlor | | 248/544 |
| 6,888,940 B1 * | 5/2005 | Deppen | | 379/446 |
| 6,981,391 B2 * | 1/2006 | Suzuki | | 63/3.1 |
| 7,374,142 B2 * | 5/2008 | Carnevali | | 248/206.5 |
| 7,699,277 B2 * | 4/2010 | Bagnall | | 248/206.5 |
| 8,161,909 B2 * | 4/2012 | Sprung | | 119/264 |
| 8,328,055 B1 * | 12/2012 | Snyder | | 224/197 |
| 8,464,377 B1 * | 6/2013 | Carson et al. | | 5/498 |
| 8,662,362 B1 * | 3/2014 | Bastian et al. | | 224/218 |
| 8,667,650 B1 * | 3/2014 | Duffin | | 24/102 SL |
| 8,752,252 B2 * | 6/2014 | Ninomiya et al. | | 24/303 |
| 8,794,682 B2 * | 8/2014 | Fiedler | | 292/251.5 |
| 2004/0069916 A1 * | 4/2004 | Cohen | | 248/230.8 |
| 2005/0082323 A1 * | 4/2005 | O'Hair | | 224/219 |
| 2011/0108589 A1 * | 5/2011 | Kim | | 224/222 |

* cited by examiner

*Primary Examiner* — Anita M King

(74) *Attorney, Agent, or Firm* — Dave Alan Lingbeck

(57) ABSTRACT

A system and method for magnetically supporting a device upon a structure for safeguarding the phone and providing immediate and convenient functional access to the phone. The apparatus and method for magnetically supporting an electronic device upon a user's arm including a connector assembly including a first magnet having a geometric shape and adapted to be securely attached to a device and also including a second magnet having a geometric shape and adapted to be securely attached to a support member and magnetically attachable to the first magnet to support the device to the support member.

4 Claims, 3 Drawing Sheets

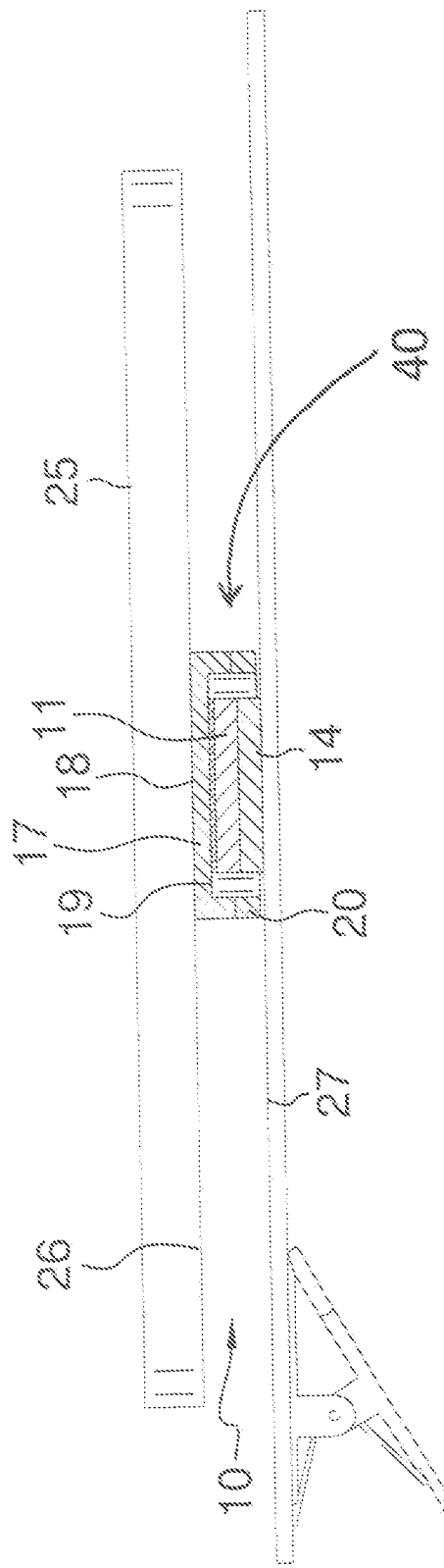

SYSTEM AND METHOD FOR MAGNETICALLY SUPPORTING A DEVICE UPON A STRUCTURE

CROSS-REFERENCE TO RELATED APPLICATIONS

The present application claims the benefit of the U.S. provisional application Ser. No. 61/909,468, filed on Nov. 27, 2013, the disclosure of which is expressly incorporated by reference herein in its entirety.

BACKGROUND OF THE INVENTION

1. Field of the Invention

The present invention relates to electronic device holders and more particularly pertains to a new system and method for magnetically supporting a device upon a structure for immediate and convenient functional access to the device.

2. Description of the Prior Art

The use of electronic device holders is known in the prior art. More specifically, electronic device holders heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a wrist-device which comprising a first module such as a personal computer and a second module consisting of a mobile telephone or a wireless telephone terminal which are coupled by means of elements in a bracelet configuration for holding the device to the arm of the user, and wherein windows are provided in said modules for the passage of electronic connection buses between said modules. Another prior art includes a generally rectangular holder base and a holder configured to secure the mobile device therein. The holder may be removably attachable to the holder base. Another prior art includes an arm harness with a control panel for operating multiple electronic devices contained by the arm harness. In addition, another prior art includes a cell phone holder headband which enables the phone to stay in a normal talking position without having to hold it there with one hand. The cell phone is fit into an elastic band that is looped through a plastic plate. The plate is fitted to a swivel joint that is connected to one end of the headband. Yet, another prior art includes a releasable holder for a portable communication device including a base clip adapted to secure to a carrier such as a belt and an article clip adapted to secure to the portable communication device. The base clip includes a channel having a bottom and side walls extending between open opposite ends with overlying flanges on both side walls spaced a selected distance from the channel bottom, and a locking tab extending into an opening in the channel bottom, a biasing member biasing the locking tab into the channel bottom opening. While these devices fulfill their respective, particular objectives and requirements, the aforementioned patents do not disclose a new apparatus and method for magnetically supporting an electronic device upon a user's arm.

SUMMARY OF THE INVENTION

The general purpose of the present invention, which will be described subsequently in greater detail, is to provide a new system and method for magnetically supporting a device upon a structure which has many of the advantages of the electronic device holders mentioned heretofore and many novel features that result in a new system and method for magnetically supporting a device upon a structure which is not anticipated, rendered obvious, suggested, or even implied by any of the prior art electronic device holders, either alone or in any combination thereof. The present invention includes a connector assembly including a first magnet having a geometric shape and adapted to be securely attached to a device and also including a second magnet having a geometric shape and adapted to be securely attached to a support member and magnetically attachable to the first magnet to support the device to the support member. None of the prior art includes the combination of the elements of the present invention.

There has thus been outlined, rather broadly, the more important features of the system and method for magnetically supporting a device upon a structure in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new system and method for magnetically supporting a device upon a structure which has many of the advantages of the electronic device holders mentioned heretofore and many novel features that result in a new system and method for magnetically supporting a device upon a structure which is not anticipated, rendered obvious, suggested, or even implied by any of the prior art electronic device holders, either alone or in any combination thereof.

Still another object of the present invention is to provide a new system and method for magnetically supporting a device upon a structure for easy and immediate access to the device.

Still yet another object of the present invention is to provide a new system and method for magnetically supporting a device upon a structure that allows the user to easily remove the device from the structure.

Even still yet another object of the present invention is to provide a new system and method for magnetically supporting a device upon a structure that allows the user to easily attach the device to the structure such as a clock being attached to a wall structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side cross-sectional elevation view of the device with magnet and a support member with another magnet with a portion of a coat in between.

FIG. 3 is a side cross-section elevation view of the device with a magnet, c-ring and plate attached to the back and with another magnet attached to the back of a clip board.

DETAILED DESCRIPTION OF THE INVENTION

Figure 1:
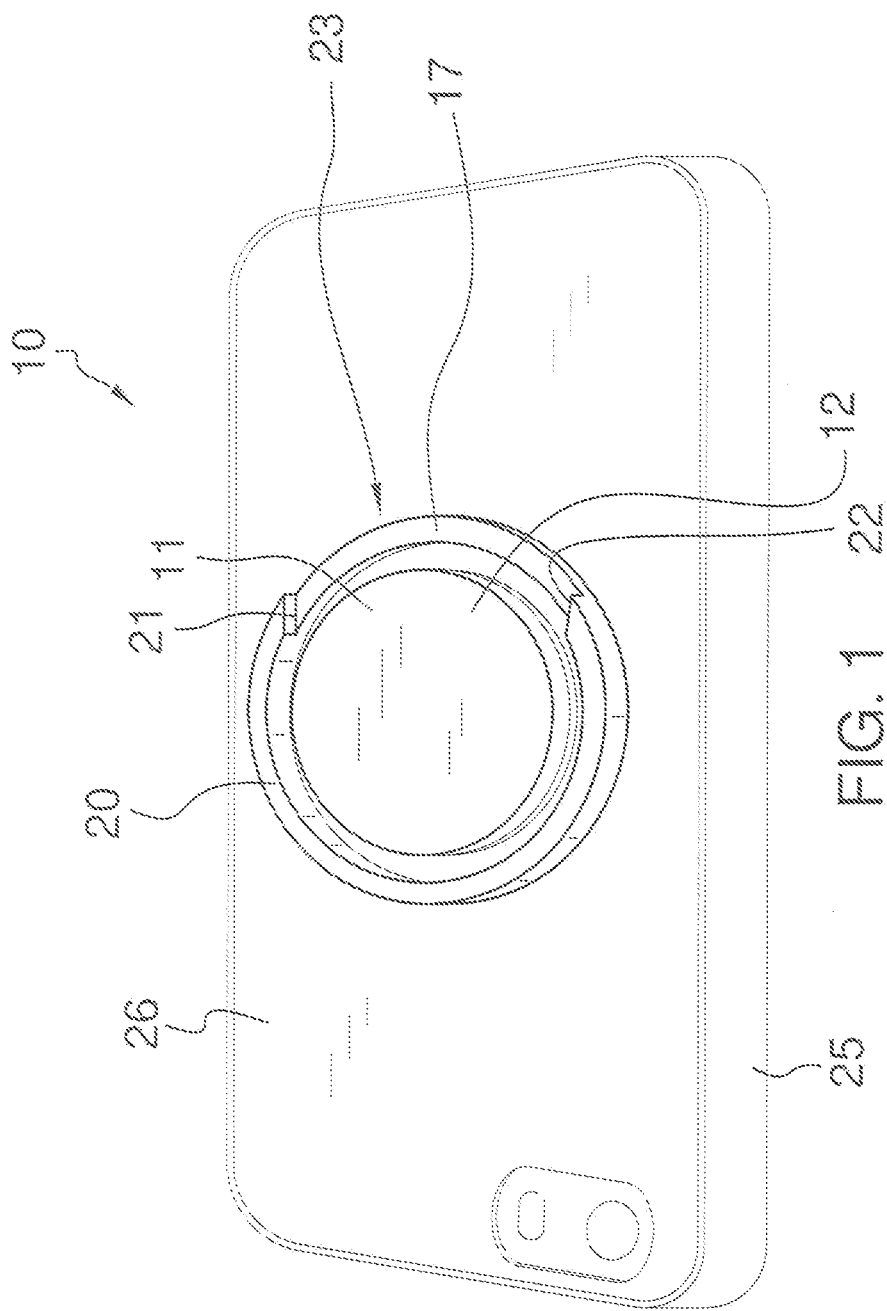
FIG. 1 is a perspective view of the back of a phone showing the plate, the C ring and the magnet depressed within the C-ring with the C-ring extending outward beyond the magnet.
Figure 2:
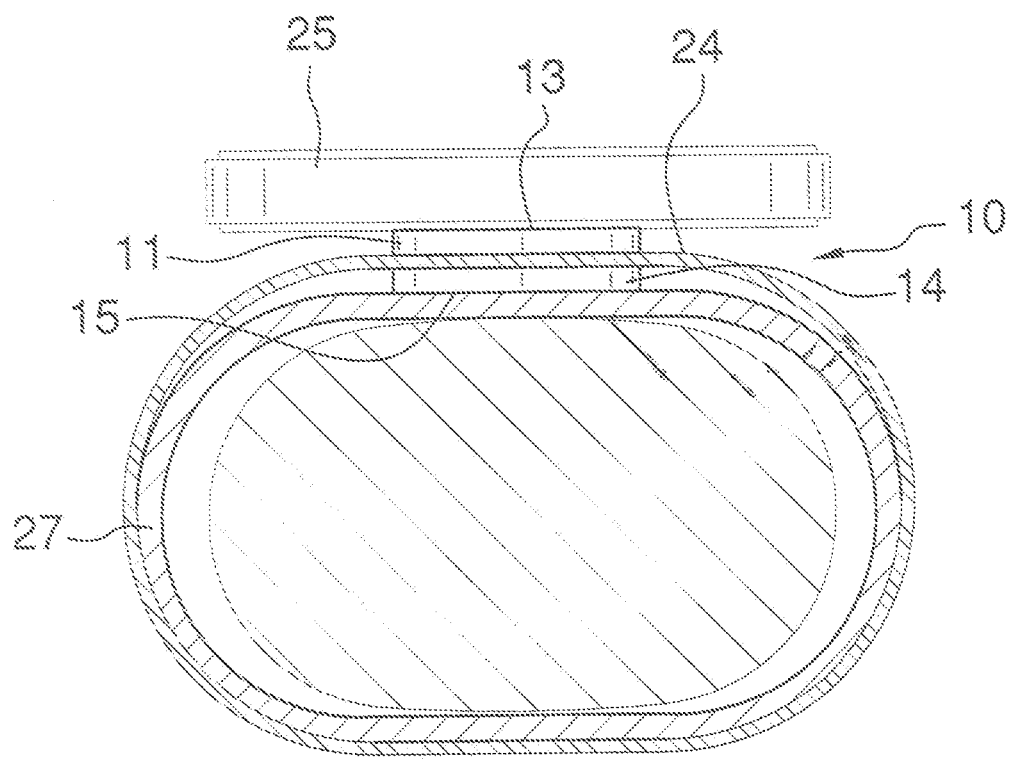

With reference now to the drawings, and in particular to FIGS. 1 through 3 thereof, a new system and method for magnetically supporting a device upon a structure embodying the principles and concepts of the present invention and generally designated by the reference numeral 10 will be described.

As best illustrated in FIGS. 1 through 3, the system and method for magnetically supporting a device upon a structure 10 may generally comprise a connector assembly 40 including a first magnet 11 having a geometric shape such as a disc or rectangular block and adapted to be securely and conventionally attached with adhesive to a device 25 and also including a second magnet 14 also having a geometric shape generally equal to the of the first magnet 11 and adapted to be securely and conventionally attached with adhesive to a support member 27 and magnetically attachable to the first magnet 11 to support the device 25 to the support member 27. The first magnet 11 may have a planar outer surface 12 and the second magnet 14 may have a planar outer surface 15 with the planar outer surfaces 12, 15 being magnetically attracted and connectable to one another. The planar outer surface 12 of the first magnet 11 has a surface area commensurate with a surface area of the planar outer surface 15 of the second magnet 14 with the planar outer surfaces 12, 15 being flush with one another when the first and second magnets 11, 14 are magnetically attached together. The connector assembly 40 may further include a plate 17 adapted to be attached to the device 25 with adhesive and having a planar inner side 18 adapted to be attached flush to the device 25 with adhesive and also having a planar outer side 19. The first magnet 11 has a planar inner surface 13 conventionally attached flush with adhesive to the planar outer side 19 of the plate 17. The connector assembly 40 may also include a ring 20 conventionally attached with adhesive to the planar outer side 19 of the plate 17 and disposed about the first magnet 11. The ring 20 extends perpendicularly and outwardly from the planar outer side 19 of the plate 17 and extends beyond the planar outer surface 12 of the first magnet 11. The ring 20 may be an open ring having ends 21, 22 which are spaced apart to form a gap 23 in the open ring. The second magnet 14 is receivable inside the ring 20 through the gap 23 of the ring 20 with the ring 20 being in contactable relationship with the second magnet 14 and restricting movement of the second magnet 14 relative to the first magnet 11. The open ring 20 may be a C-shaped flange. The connector assembly 40 may further include a piece of clothing 24 removably overlaying the second magnet 14. The piece of clothing 24 may be sandwiched between the first and second magnets 11, 14 when the first magnet 11 is removably connected to the second magnet 14 to support the device 25 to the support member 27.

In use, the first magnet 11 is magnetically connected to the second magnet 14 to support the device 25 to the support member 27. The second magnet 14 is positioned in planar alignment with the open ring 20 and at least a portion of the second magnet 14 is inserted through the gap 23 of the open ring 20 and onto the first magnet 11. The first magnet 11 may be conventionally attached to a back 26 of a cell phone and the second magnet 14 may be conventionally attached to an arm mount and the cell phone may be magnetically connected to the arm mount. Also, a piece of clothing 24 may be placed upon the second magnet 14 and sandwiched between the first and second magnets 11, 14. For example, the user may strap the arm mount about one's arm and then put on a coat over the arm mount and the second magnet 14, and then the user can magnetically connect the first magnet 11 to the second magnet 14 with a piece of the coat 24 sandwiched in between to support the cell phone to the user's arm. Also, the first magnet 11 may be conventionally attached to a back of a computer tablet and the second magnet 14 may be conventionally attached to a back of a clipboard with the computer tablet being magnetically connected to the clipboard. Thus, the user would have immediate use of both the clipboard and the computer tablet. Further, the first magnet 11 may be conventionally attached to the back of clock and the second magnet 14 being conventionally attached to a wall structure with the clock being magnetically attached to the wall structure. Thus, the user could easily mount the clock to the wall structure. Also, the user can easily remove the first magnet 11 from the second magnet 14 to detach the device from the support member 27 as needed. For example, the user can easily remove the clock from the wall structure to replace the batteries in the clock.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the apparatus and method for magnetically supporting an electronic device upon a user's arm. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A system for magnetically supporting a device upon a structure comprising:
   a connector assembly including a first magnet having a geometric shape and adapted to be securely attached to a device and also including a second magnet having a geometric shape and adapted to be securely attached to a support member and magnetically attachable to the first magnet to support the device to the support member, wherein the connector assembly also includes a ring disposed about the first magnet, wherein the ring is an open ring having ends which are spaced apart to form a gap in the open ring, wherein the second magnet is receivable inside the ring through the gap of the ring with the ring being in contactable relationship with the second magnet and restricting movement of the second magnet relative to the first magnet, wherein the open ring is a C-shaped flange.

2. A method for magnetically supporting a device upon a structure comprising the steps of:

provide a connector assembly including a first magnet attached to a device and also including a second magnet attached to a support member;

magnetically connecting the first magnet to the second magnet to support the device to the support member and attaching the first magnet to a back of a cell phone and attaching the second magnet to an arm mount and magnetically connecting the cell phone to the arm mount, and further overlaying the second magnet with clothing and sandwiching the clothing between the first and second magnets; and removing the first magnet from the second magnet to detach the device from the support member as needed.

3. A method for magnetically supporting a device upon a structure comprising the steps of:

providing a connector assembly including a first magnet attached to a device and also including a second magnet attached to a support member and further including an open ring disposed about the first magnet and having ends which are spaced apart to form a gap therebetween;

magnetically connecting the first magnet to the second magnet to support the device to the support member, and attaching the first magnet to a back of a computer tablet and attaching the second magnet to a back of a clipboard and magnetically connecting the computer tablet to the clipboard; and removing the first magnet from the second magnet to detach the device from the support member as needed.

4. A method for magnetically supporting a device upon a structure comprising the steps of:

providing a connector assembly including a first magnet attached to a device and also including a second magnet attached to a support member and further including an open ring disposed about the first magnet and having ends which are spaced apart to form a gap therebetween;

magnetically connecting the first magnet to the second magnet to support the device to the support member, and attaching the first magnet to a back of clock and attaching the second magnet to a wall structure and magnetically connecting the clock to the wall structure; and removing the first magnet from the second magnet to detach the device from the support member as needed.

\* \* \* \* \*